Figure 1:
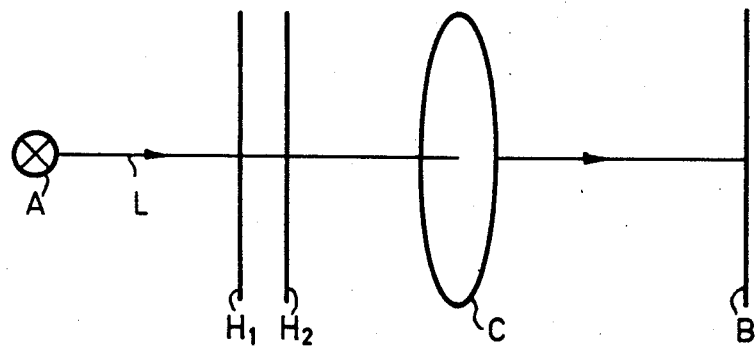

imited States  [11] 3,810,687
De Lang et a  [45] May 14, 1974

[54] APPARATUS FOR RECONSTRUCTING AN IMAGE OF AN OBJECT WHICH IMAGE HAS BEEN RECORDED IN HOLOGRAPHIC FORM

[75] Inventors: Hendrik De Lang; Christiaan Hendrik Frans Velzel, both of Emmasingel, Eindhoven, Netherlands

[73] Assignee: U.S. Philips Corporation, New York, N.Y.

[22] Filed: Aug. 30, 1972

[21] Appl. No.: 285,023

[30] Foreign Application Priority Data
Sept. 9, 1971 Netherlands .................... 7112393

[52] U.S. Cl. ................................ 350/3.5
[51] Int. Cl. ............................. G02b 27/00
[58] Field of Search ...................... 350/3.5

[56] References Cited
OTHER PUBLICATIONS
El-Sym, "Reconstructed Wave-Front Microscopy" Doctoral Dissertation, Stanford Univ., 1952, pp. 110-123.
Rogers, "Proc. of the Royal Society of Edinburgh," Sect. A, Vol. 63, 1950-1951, pp. 193-221, (pp. 219 relied upon).
Bryngdahl et al., "Jour. of the Optical Society of America," Vol. 58, No. 5, May, 1968, pp. 620-624.

Primary Examiner—Ronald J. Stern
Attorney, Agent, or Firm—Frank R. Trifari

[57] ABSTRACT

An apparatus for reconstructing an image of an object, which image has been recorded in holographic form, is described which comprises a source of radiation capable of emitting a reconstructing beam of radiation, and two holograms the corresponding points of which have a phase difference of 90°. It is shown that by preparing one of the holograms as a phase holograms and the other as an amplitude hologram the conjugate image can be suppressed in a simple optical arrangement.

4 Claims, 3 Drawing Figures

APPARATUS FOR RECONSTRUCTING AN IMAGE OF AN OBJECT WHICH IMAGE HAS BEEN RECORDED IN HOLOGRAPHIC FORM

The invention relates to an apparatus for reconstructing an image of an object, which image has been recorded in holographic form, which apparatus comprises a source of radiation capable of emitting a reconstructing beam of radiation, and two holograms the corresponding points of which have a phase difference of 90°.

When an object is illuminated with a beam of coherent radiation and the part of this beam diffracted by the object and the part of the beam not influenced by the object, i.e. the background illumination, are together recorded on a photographic plate, a hologram is produced which looks entirely different from the original object. By illuminating the hologram with a beam of coherent radiation the hologram may be reconstructed, that is to say an image of the original objects may be formed. However, in this "in-line" holography only one half of the radiation from the hologram will contribute to the formation of the desired image. The remainder of the radiation forms a second image, which is referred to as a conjugate image and for an observer is aligned with the desired image and hence disturbs the latter. The conjugate image may be separated from the desired image in that in recording the hologram a beam which is incident on the photographic plate at an angle to the beam from the object is used as background or reference radiation. In this method, however, the undesirable image is not suppressed in reconstruction. The desired image still contains only one half of the information about the object.

Moreover, in some cases it is not possible to cause the reference beam to be at an angle to the beam from the object, so that in these cases "in-line" holography has to be used.

From the paper "Interference Microscope with Total Wavefront Reconstruction" by D. Gabor and W. P. Goss in "Journal of the Optical Society of America" 56 (1966), pages 849–858, it is known that in "in-line" holography the original wave scattered by the object, which is generally referred to as the object wave, may be restored completely, i.e. in amplitude and in phase, by using two holograms. This enables a complete optical image of the object to be obtained. In the known holographic process the information from the object is stored in two amplitude holograms situated side by side, corresponding parts of these amplitude holograms differing 90° in phase. In reconstruction these holograms must be illuminated with separate radiation beams which have a relative phase difference of 90°. For this purpose the known process of reconstruction requires a complicated optical arrangement. Moreover, the radiation which emerges from the holograms contains, in addition to the desired object wave, a so-called primary wave, that is to say a wave which is not influenced by the holograms and does not contribute to the image formation.

It is an object of the invention to provide an apparatus of the type described at the beginning of this specification which is of simple structure. The apparatus according to the invention is characterized in that one of the holograms is a phase hologram and the other is an amplitude hologram.

The holograms may be inserted in the path of the radiation beam one behind the other. This enables the conjugate image to be suppressed by means of a very simple optical arrangement.

As an alternative, however, the holograms may be disposed in the separate paths of sub-beams into which the radiation beam is divided by a beam-splitting mirror, an adjustable phase shifter being included in the path of one of the sub-beams. In this manner the conjugate image may be eliminated and the primary wave may be suppressed.

The primary wave may also be suppressed in an apparatus according to the invention in which the two holograms are inserted, one behind the other, in the path of one of the sub-beams into which the beam of radiation is divided by a beam-splitting mirror, an adjustable phase shifter being inserted in the path of the other sub-beam. The latter apparatus has the advantage that it may also be used for recording holograms.

Figure 2:
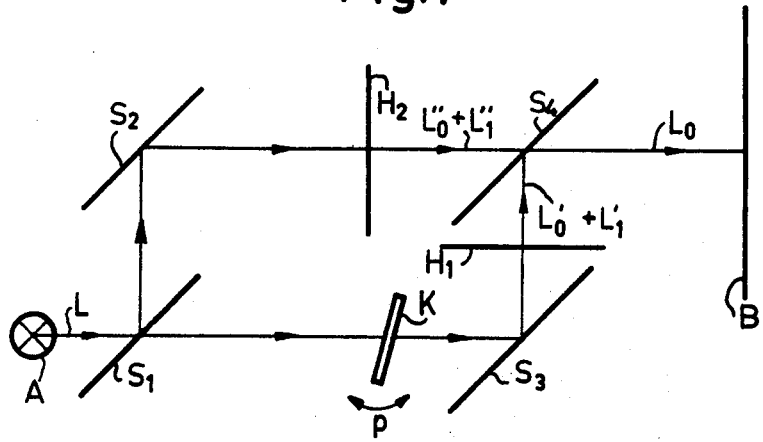
Figure 3:
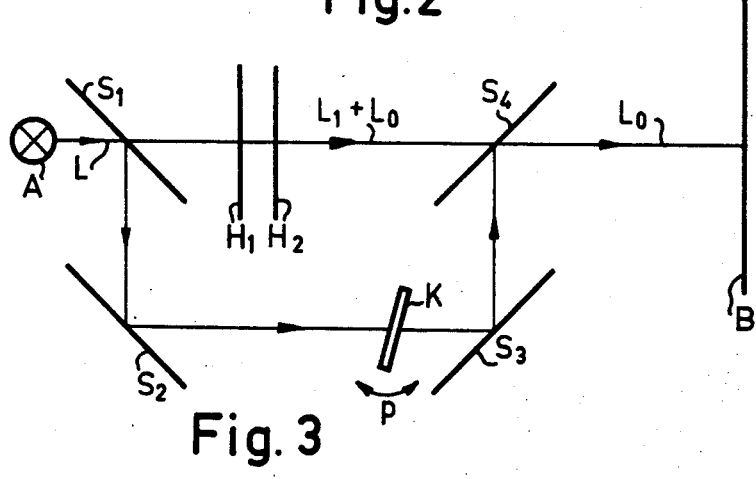

Embodiments of the invention will now be described, by way of example, with reference to the accompanying diagrammatic drawing, in which:

FIG. 1 shows an embodiment of an apparatus for reconstructing holograms according to the invention, and FIGS. 2 and 3 show two embodiments of such an apparatus in which the primary wave is suppressed. In these Figures corresponding elements are designated by the same reference symbols.

In the apparatus shown in FIG. 1 a source of radiation A emits a coherent beam L only one ray of which is shown for simplicity. The beam L may be equal to the reference beam used in recording the holograms. Two holograms $H_1$ and $H_2$ have been placed in the path of the radiation beam L.

The hologram $H_2$ is an amplitude hologram, i.e. the information about the object to be imaged is recorded in the hologram in the form of a configuration of regions which differ in radiation transmittance. The hologram $H_1$ is in the form of a phase hologram, which means that it consists, for example, of regions having different refractive indices in accordance with the information to be imaged. The hologram $H_1$ may also take the form of a relief pattern. Such a phase hologram is obtainable by bleaching a corresponding amplitude hologram.

The radiation which has passed through the two holograms comprises a true reconstruction of the object wave, as emitted by the object when recording the hologram, and a primary wave.

The holograms $H_1$ and $H_2$ are recorded in phase quadrature. For some applications, however, they may be made according to the principle of what is generally referred to as single-sideband holography. According to this principle, in recording the holograms spatial filtering is performed in the plane in which the spatial frequency spectrum of the object is produced, the Fourier plane, by blocking out one half of the Fourier plane. For a detailed description of single-sideband holography we refer to the paper "Single-sideband Holography" by O. Bryngdahl and A. Lohmann in "Journal of the Optical Society of America," Vol.58, No. 5, May, 1968, pages 620–624. When making the holograms $H_1$ and $H_2$ in succession, complementary half planes of the Fourier plane are blocked out.

This holographic method is of particular importance for electron-optical exposures. In an electron microscope part of the diffraction image may be blocked out, a hologram, for example the hologram $H_1$, being recorded of the remainder. When recording the hologram $H_2$ the complementary part of the diffraction image is blocked out. The holograms obtained may be reconstructed in the aforedescribed manner.

A lens C may be inserted in the path of the beam of radiation which emerges from the holograms in order to correct the spherical aberration of the electron microscope, so that in the image plane B there is produced a true light-optical reconstruction of the original electron-optical wave which emerges from the object. Furthermore, in the Fourier plane of the lens C steps may be taken to obtain phase contrast, amplitude contrast or interference contrast.

Suppression 2 shows a preferred embodiment of an apparatus according to the invention for reconstructing a holographic image with, in addition, supression of the primary wave. Suppression of the primary wave is important in reconstructing hologams of three-dimensional — or thick — objects. When recording three-dimensional objects the object is illuminated via a light diffuser, so that the information about each point of the object is distributed over the entire hologram area.

In the apparatus shown in FIG. 2 the radiation beam L from the source A is divided into two sub-beams by a beam-splitting mirror $S_1$. These sub-beams are reunited to a single beam by totally reflecting mirrors $S_2$ and $S_3$ and a beam-splitting mirror $S_4$. The holograms $H_1$ and $H_2$ are placed in the separate paths of the sub-beams. The path of one of the sub-beams also includes a phase plate K which may be pivoted in the direction indicated by an arrow $p$. From the holograms $H_1$ and $H_2$ there emerge, in addition to the desired object waves $L'_0$ and $L''_0$ respectively, primary waves $L'_1$ and $L''_1$ respectively. The plate K is pivoted to a position such that the radiation beam emerging from the plate is in opposition to the radiation beam incident on the plate. The two primary waves $L'_1$ and $L''_1$ which emerge from the holograms are maintained in phase opposition, so that behind the beam-splitting mirror $S_4$ the desired object wave $L_0$ alone remains. Instead of the phase plate K another phase shifting element, for example a pressure cell, may be used.

The primary wave may alternatively be suppressed in an apparatus as shown in FIG. 3. In this apparatus the holograms $H_1$ and $H_2$ are both illuminated with the same sub-beam. The primary wave $L_1$ which in addition to the object wave $L_0$ emerges from the holograms is added to the other sub-beam which is maintained in phase opposition by the phase plate K. Behind the beam-splitting mirror $S_4$ the desired object wave alone remains.

The apparatus shown in FIG. 3 may also be used in recording the holograms $H_1$ and $H_2$. To that end a light diffuser and the object are placed at the positions of $H_1$ and $H_2$. A photographic plate is placed to the right of $S_4$. The mirrors $S_1$, $S_2$, $S_3$ and $S_4$ now have the purpose of separating a part of the beam of radiation emitted by the source A and adding this part as the reference beam to the radiation beam from the object, the phase of the reference beam being adjustable by means of the phase plate. By adjusting the phase plate K the holograms $H_1$ and $H_2$ may be made with reference beams which differ 90° in phase. For the significance of this phase difference we refer to the aforementioned paper by Gabor and Goss.

What is claimed is:

1. Apparatus for reconstructing an image of an object comprising a source of coherent radiation providing a beam of hologram reconstructing radiation along a given path, a phase hologram of the object in the path of said radiation, and an amplitude hologram in the path of said radiation, the corresponding points of the phase and amplitude holograms having a phase difference of 90°, the phase and amplitude holograms being positioned to superimpose the object information stored therein on reconstruction.

2. Apparatus as claimed in claim 1, wherein the holograms are inserted in the path of the radiation beam one behind the other.

3. Apparatus as claimed in claim 1, further comprising means for dividing the radiation beam into sub-beams, wherein each hologram is located in a separate sub-beam, further comprising an adjustable phase shifter in the path of one of the sub-beams.

4. Apparatus as claimed in claim 1, comprising means for dividing the radiation from the source into sub-beams, wherein the phase and amplitude holograms are placed one behind the other in the path of one of the sub-beams, the apparatus further comprising an adjustable phase shifter in the path of the other sub-beam.

* * * * *